US005621815A

United States Patent [19]
Talukdar et al.

[11] Patent Number: 5,621,815
[45] Date of Patent: Apr. 15, 1997

[54] GLOBAL THRESHOLD METHOD AND APPARATUS

[75] Inventors: Dipankar Talukdar, Buffalo; Ramalingam Sridhar, East Amherst; Victor Demjanenko, North Tonawanda, all of N.Y.

[73] Assignee: The Research Foundation of State University of New York, Buffalo, N.Y.

[21] Appl. No.: 311,199

[22] Filed: Sep. 23, 1994

[51] Int. Cl.$^6$ .............................. G06K 9/62; G06K 9/36; G06K 9/46; H04N 1/40
[52] U.S. Cl. .......................... 382/159; 382/172; 382/270; 382/271; 358/466
[58] Field of Search .................................. 382/172, 271, 382/270, 159; 358/466, 445, 447; 367/131

[56] References Cited

U.S. PATENT DOCUMENTS

| | | | |
|---|---|---|---|
| 5,086,484 | 2/1992 | Katayama et al. | 382/270 |
| 5,109,436 | 4/1992 | Machida et al. | 382/270 |
| 5,181,254 | 1/1993 | Schweizer et al. | 382/172 |
| 5,268,774 | 12/1993 | Eschbach | 358/466 |

OTHER PUBLICATIONS

P. Palumbo, P. Swaminathan, & S. Srihari, "Document Image Binarization: Evaluation of Algorithms", *SPIE Applications of Digital Image Processing IX*, vol. 697, pp. 278–285, 1986.

J. Kittler, J. Illingworth, & J. Foglein, "Threshold Selection Based On A Simple Image Statistic", *Computer Vision Graphics, and Image Processing*, vol. 30, pp. 125–147, May 1985.

P. K. Sahoo, S. Soltani, A.K.C. Wong & Y.C. Chen, "A Survey of Threshold Techniques", *Computer Vision, Graphics, and Image Processing*, vol. 41, pp. 233–260, Feb. 1988.

N. Otsu, "A Threshold Selection Method from Gray–Level Histograms", *IEEE Transactions On Systems, Man, and Cybernetics*, vol. SMC–9, No. 1, pp. 62–66, Jan. 1979.

A.C. Kak & A. Rosenfeld, "Clustering and Gray Level Thresholding", *Digital Picture Processing, New York: Academic Press*, pp. 61–73, 1982.

J.S. Weszka & A. Rosenfeld, "Histogram Modification for Threshold Selection", *IEEE Transaction On Systems, Man, And Cybernetics*, vol. SMC–9, No. 1, pp. 38–52, Jan. 1979.

T.W. Ridler & S. Calvard, "Picture Thresholding Using An Iterative Selection Method", *IEEE Transactions On Systems, Man, Cybernetics*, vol. SMC–8, pp. 630–632, Aug. 1978.

J. S. Weszka, R. N. Nagel, & A. Rosenfeld, "A Threshold Selection Technique", *IEEE Transaction On Computers*, vol. 9, pp. 1322–1326, Dec. 1974.

S. Watanabe & The CYBEST Group, "An Automated Apparatus For Cancer Prescreening: CYBEST", *Computer Graphics And Image Processing*, vol. 3, pp. 350–358, Dec. 1974.

A. Rosenfeld & P. De La Torre, "Histogram Concavity Analysis As A Aid In Threshold Selection", *IEEE Transactions On Systems, Man, and Cybernetics*, vol. SMC–13, No. 3, pp. 231–235, Mar./Apr. 1983.

T. Pun, "Entropic Thresholding, A New Approach", *Computer Graphics And Image Processing*, vol. 13, pp. 210–239, Aug. 1980.

(List continued on next page.)

*Primary Examiner*—Leo Boudreau
*Assistant Examiner*—Monica S. Davis
*Attorney, Agent, or Firm*—Nixon, Hargrave, Devans & Doyle LLP

[57] ABSTRACT

The problem of thresholding is considered from a clustering point of view and a novel weight-based clustering method (WCThresh) is implemented in a neural network image processor 50. The neural network image processor 50 uses weights 51–53, representing clusters of gray scale pixels of an image of document 43, to provide a threshold for the image of document 43. The processor 50 modifies weights 51–53 with the input pixels and comparator 60 using a nearest value criterion to provide the threshold.

26 Claims, 13 Drawing Sheets

OTHER PUBLICATIONS

J. N. Kapur, P.K. Sahoo, & A. K. A. Wong, "A New Method For Gray–Level Picture Thresholding Using The Entropy Of The Histogram", *Computer Vision, Graphics, And Image Processing*, vol. 29, pp. 273–285, Mar. 1985.

W. Tsai, "Moment–Preserving Thresholding: A New Approach", *Computer Vision, Graphics, and Imaging Processing*, vol. 29, pp. 377–393, Mar. 1985.

K. Kittler & J. Illingworth, "On Threshold Selection Using Clustering Criteria", *IEEE Transactions On Systems, Man, And Cybernetics*, vol. SMC–15, No. 5, pp. 652–655, Sep./Oct. 1985.

Y. J. Zhang & J. J. Gerbrands, "Transition Region Determination Based Thresholding", *Pattern Recognition Letters*, vol. 12, No. 1, pp. 13–23, Jan. 1991.

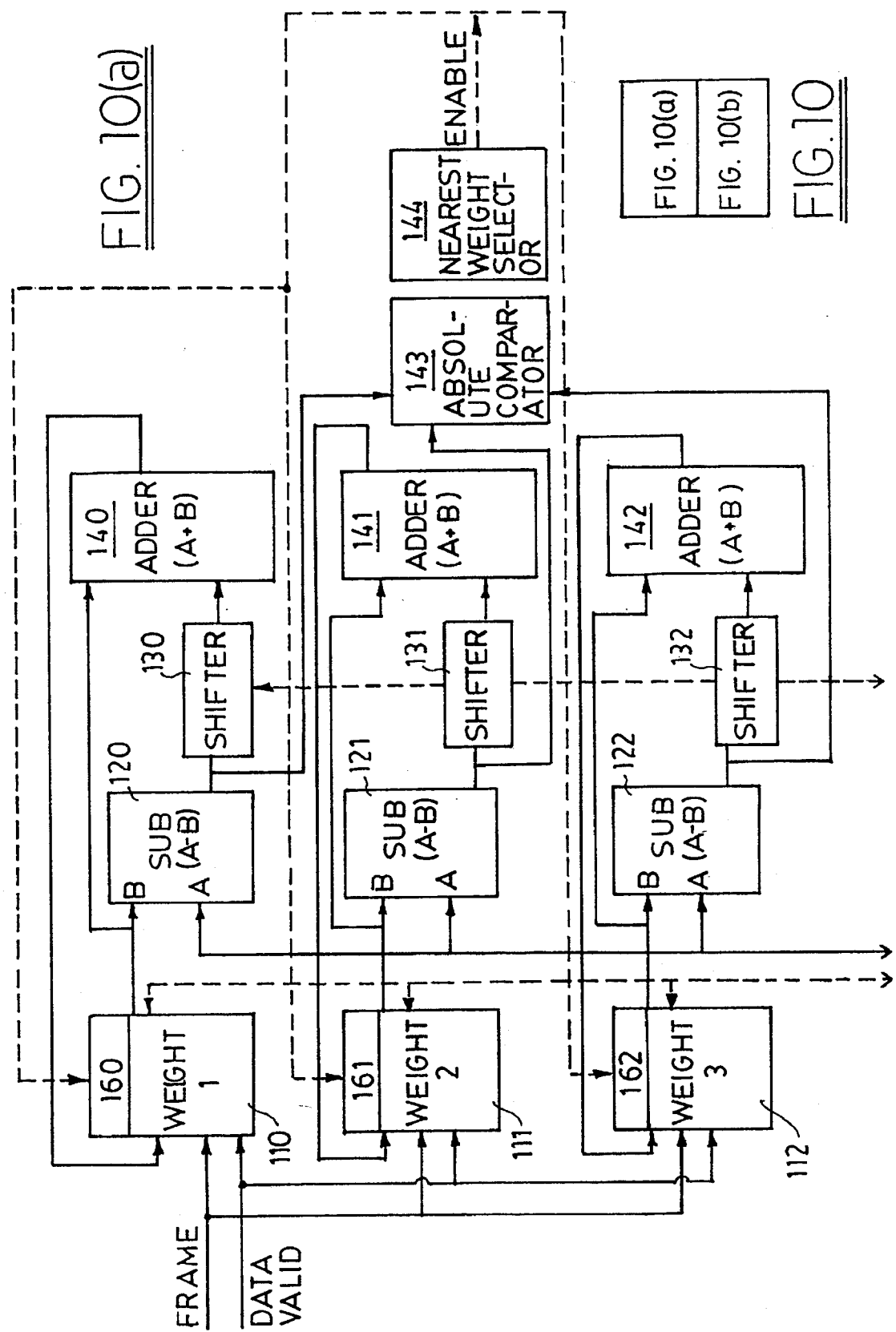

GLOBAL THRESHOLD METHOD AND APPARATUS

The primary goal of a pattern recognition system is to identify objects of interest within a given scene. Such systems divide the complex image into areas which represent objects in the image. In other words, the image area is classified in terms of objects present (foreground) and the background. These classification problems can be difficult for images which contain a wide range of gray level values. In most of the applications in pattern recognition, the images are represented in a digital form. The images are generally obtained using scanners. The scanner converts the illumination of the scene into a series of pixel data signals of different magnitudes. The number of different illumination levels, termed as the gray levels, that can be represented depends on the number of possible output values of the scanner. Real world images have a wide illumination range. Hence, the gray levels of the foreground objects of interest also vary similarly. This variation makes the classification problem difficult. However, in many applications, such as text recognition and medical or industrial inspection, the main features of an image can be represented by as few as two gray levels.

A typical example is the document image analysis. The document images are generally images of dark ink text on a white background. In an idealized text image, the foreground is represented by one gray level, say black, and the background by another, say white. In such images, the foreground object is easily recognized by the pattern recognition system. The problem becomes difficult when this idealized assumption is not satisfied.

A major field of application of thresholding is the postal address recognition systems. The goal of such a system is to identify and recognize the destination address on a mailpiece. Such a process can be used for automatic sorting of mailpieces in a post office. Different image processing and pattern recognition methods are used to process the digitized pixel data signals representative of an image of the address. In general, the address is written in dark on a light background. Only two gray levels are necessary and sufficient to represent the required information in such an image. But due to the unevenness of paper quality, text, background and illumination, the digitized image contains much more than two levels. Binarization (thresholding) of the image becomes necessary to remove the unwanted variation in the gray level resulting in distinct representation of the foreground text and background. Otherwise the recognition processes have to deal with the gray level variation, which makes the process complex. Different approaches have been used for the determination of the optimum threshold, see e.g. [B]. Another method based on discriminant analysis is an effective good algorithm that can be applied for thresholding. [C]. Existing thresholding systems can be divided into two groups, global and local. A local thresholding system computes a single threshold value and applies it uniformly to the entire image. Many global thresholding systems are based on image histogram processing. See Sahoo et al., supra. The histogram of an image is the distribution of the gray levels. Each value in the histogram represents the total number of pixels with a certain gray level. So if the image consists of two groups of pixels, one formed by the foreground text and the other by the background, there will be two peaks in the histogram corresponding to the two image clusters. So the problem of thresholding reduces to the problem of detecting these two groups and find a gray level which effectively separates these two groups. The suitability of this threshold can be measured in terms of class variances.

FIG. 1 shows an ideal histogram 20 where there are two distinct peaks 22, 24 separated by a deep valley 23. Ideally, a histogram peaks 22, 24 represent the foreground and background pixels with a deep and sharp valley 23. In such a case a value at the bottom of the valley 23 is chosen as the threshold. But in real-world images, the valley bottom is often not well defined. In some text images, the number of foreground pixels is a very small fraction of the total size. In such a case, the two peaks are of extremely unequal height and produces no traceable valley. FIG. 2 shows a histogram 30 of black letters on a gray background. Though there are two distinct groups of pixels 32, 34, only one peak 34 is prominent in the histogram. If the foreground pixel cluster is broad or the image is noisy it is difficult to find a valley. Different techniques have been developed to overcome these problems [E].

The sharp valley technique, for example, restricts the histogram to the pixels of large absolute values of the derivative [G]. In a difference histogram method, the gray level with the maximum amount of difference is used as the threshhold value [H]. That method modifies the histogram using neighboring pixels to make it suitable for thresholding. The method proposed by Otsu uses a discriminant criterion to find the threshold. See Otsu, supra. The zeroth and the first order cumulative moments of the gray-level histogram are used to compute a number of class variances. A ratio of the between-class variance and the total-variance is taken as the discriminant measurement. This is computed for all gray levels and the level for which it is maximum is taken as the threshold. Histogram concavity [I], maximization of entropy [J], [K], moment preservation [L]etc. have been used to derive a threshold.

Some other methods use modified histograms, such as secondary gray levels [E]. Other methods are not based on histograms but rather on clustering criterion [M], transition region determination [IN]or iteration [F]. A statistical method which does not use histogram is presented in [A].

A local thresholding technique generally divides the image into subimages and finds threshold for each subimage using a local thresholding technique. Such systems vary in the sub-image size and the local thresholding method used. Smoothing is done to eliminate discontinuities at the subimage boundaries. A comparison of most of these methods is found in [B].

TABLE OF REFERENCES

A. J. Kittler and J. Illingworth, "Threshold Selection Based on a Simple Image Statistic", *Computer Vision, Graphics, and Image Processing*, vol. 30, May 1985.

B. Sahoo and et al., "A Survey of Thresholding Techniques," *Computer Vision, Graphics, and Image Proc.*, vol. 41, February 1988.

C. N. Otsu, "A Threshold Selection Method from Gray-Level Histograms," *IEEE Trans. on Systems, Man, and Cybern, vol.* 9, January 1979.

D. A. C. Kak and A. Rosenfeld, *Digital Picture processing*. New York: Academic Press, 1982.

E. Weszka and et al., "Histogram Modification for Threshold Selection," *IEEE Trans. on Systems, Man, and Cybern.*, vol. 9, January 1979.

F. T. W. Ridler and S. Calvard, "Picture Thresholding Using an iterative Selection method," *IEEE Trans. on Systems, Man, and Cybern.*, vol. 8, August 1978.

G. Weszka and et al., "A Threshold Selection technique," *IEEE Trans. on Comput.*, vol. 9, December 1974.

H. S. Watanabe and C. Group, "An Automated Apparatus for Cancer Prescreening: CYBEST," *Comp. Graph. Image process.*, vol. 3, December 1974.

I. A. Rosenreid and P. De La Torre, "Histogram Concavity Analysis as an aid in threshold selection," *IEEE Trans. on Systems, Man, and Cybern.*, vol. 13, March/April 1983.

J. T. Pun, "Entropic Thresholding: A New Approach," *Computer Vision, Graphics, and Image Proc.*, vol. 16, July 1981.

K. J. N. Kapoor and et al., "A New Method for Gray-level Picture Thresholding using the Entropy of the Histogram," *Computer Vision, Graphics, and Image Proc.*, vol. 29, March 1985.

L. W. Tsai, "Moment-preserving Thresholding: A New Approach," *Computer Vision, Graphics, and Image Proc.*, vol. 29, March 1985.

M. J. Kittler and J. Illingworth, "On Threshold Selection Using Clustering Criterion," *IEEE Trans. on Systems, Man, and Cybern.*, vol. 15, September 1985.

N. Y. J. Zhang and J. Gerbrand, "Transition Region Determination based Thresholding," *Pattern Recognition Letters*, vol. 12, January 1991.

O. J. Dayhoff, *Neural Network Architecture.* Van Nostrand Reinhold, 1990.

The histogram based systems of the prior art are complex. Implementing such systems often requires the use of a computer with large storage capability and operating a complex program that process each pixel two or more times. Such systems are expensive and slow.

SUMMARY

Thresholding is basically a problem of classification. We have discovered that artificial neural networks can be combined into a pattern recognition system by using the classification ability of such networks to provide a global threshold processor and method. In particular, this invention presents an effective method to treat the thresholding problem with a neural network type structure. A weight based clustering technique of the invention performs well on complex images for which other methods fail. The invention uses a neural network structure to classify the pixels of the image into foreground and background. The process trains the network to obtain the locations of the pixel groups. Once their position in the gray level scale is known, an optimum threshold signal is generated to separate the groups. In one embodiment, the invention is tuned to perform well with address block images of mailpieces, though the invention can be expanded to include similar problems in other applications with appropriate changes to the parameters of the invention. One feature of the invention includes its simplicity and ease of implementation. The invention provides a single pass method that operates on each pixel data signal and requires minimal post processing, which makes it suitable for real-time applications. The invention is implemented using computationally simple logic.

As such, the invention provides an image signal processing method and apparatus. The processing system has a scanner with a suitable means, such as a charge coupled device camera, for scanning a document to generate a series of pixel data signals. Each pixel data signal comprises a byte of binary data bits. The pixel data signal has a magnitude proportional to the intensity of the pixel. The pixel data signals are stored in a memory, preferably a bit mapped memory corresponding to the image scanned. The pixel data signals are presented serially to a neural network that generates a threshold signal.

The neural network has a plurality of weight registers, each register holding a weight data signal. The pixel data signal is compared to each Height data signal to determine the weight data signal closest to the pixel data signal. The closest weight data signal is updated by increasing the value of the weight data signal in a manner to reduce the difference between the weight data signal and the pixel data signal. The process is repeated for each pixel. Each time a weight register is updated, a count is made. After the last pixel data signal is processed, a threshold circuit determines the average value of the weight data signals. That average value is used as a threshold value for each pixel data signals stored in the memory. After thresholding, the resultant pixel data signals are a series of binary data signals indicating foreground (text, black) or background (white).

If the document scanned has only text on a light or white background, only two weight registers are needed. However, often documents have varying backgrounds including lightly printed text, such as a logo, so three weight registers are needed to properly distinguish between text and the different backgrounds.

The thresholding operation can be implemented using an application specific integrated circuit (ASIC) with a minimum of standard circuits. The ASIC device has an input latch for receiving the pixel data signals. The latch applies the signals to three subtractor circuits. Three weight registers provide the other input to the three subtractor circuits. An absolute comparator identifies the smallest difference among the subtractors and updates the weight register closest to the pixel data signal. Updating is performed by a barrel shifter and an adder associated with each register. The rate of change of update is decreased as the number of pixels processed is increased because the weight data signals converge. A learn rate counter keeps track of the pixel data signals processed and alters the rate of update of the weight registers. Contrast counters are provided to test for spurious pixels, low contrast and very low contrast documents.

DRAWINGS

Figure 10B:
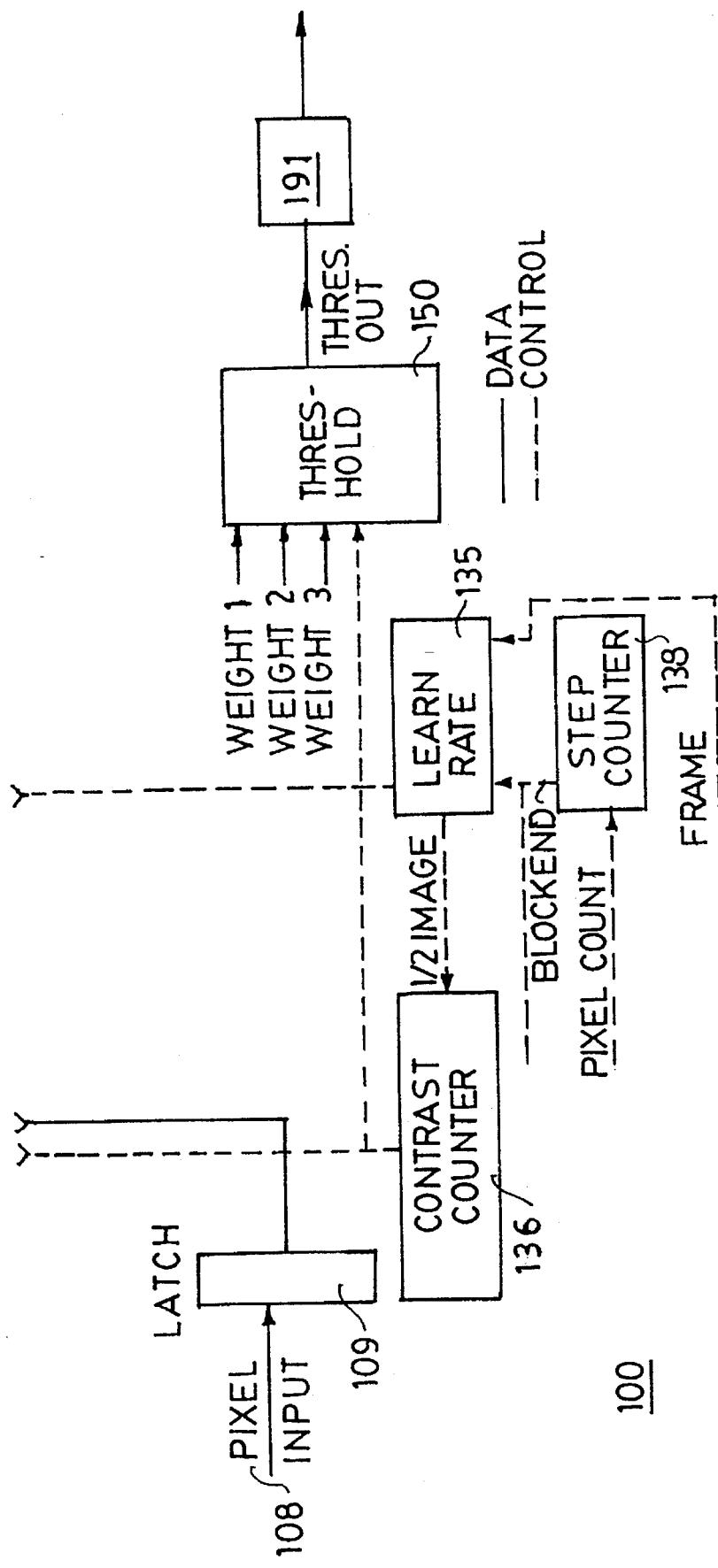

FIG. 10, comprising FIGS. 10A and 10B, is a schematic diagram of an application specific integrated circuit image processing device.

Figure 11:
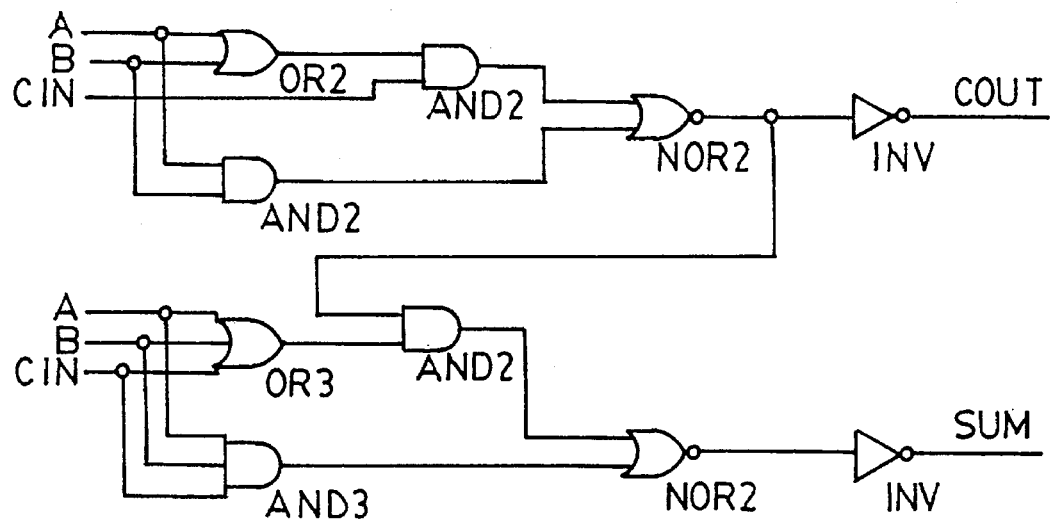

FIG. 11 is a logic diagram of an adder.

Figure 12:
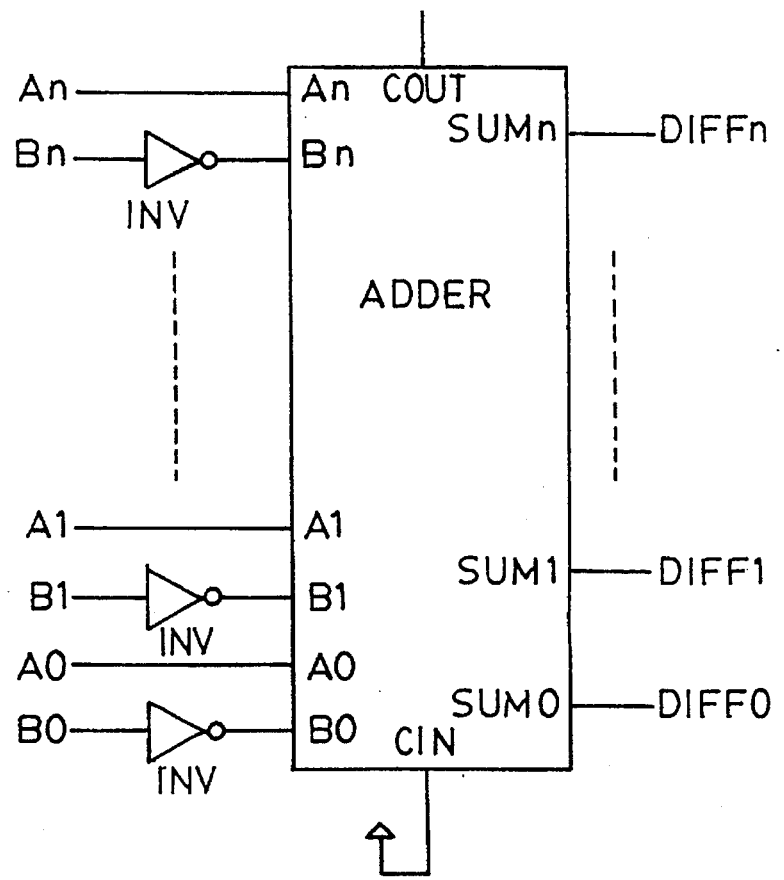

FIG. 12 is a logic diagram of a subtractor.

Figure 13:
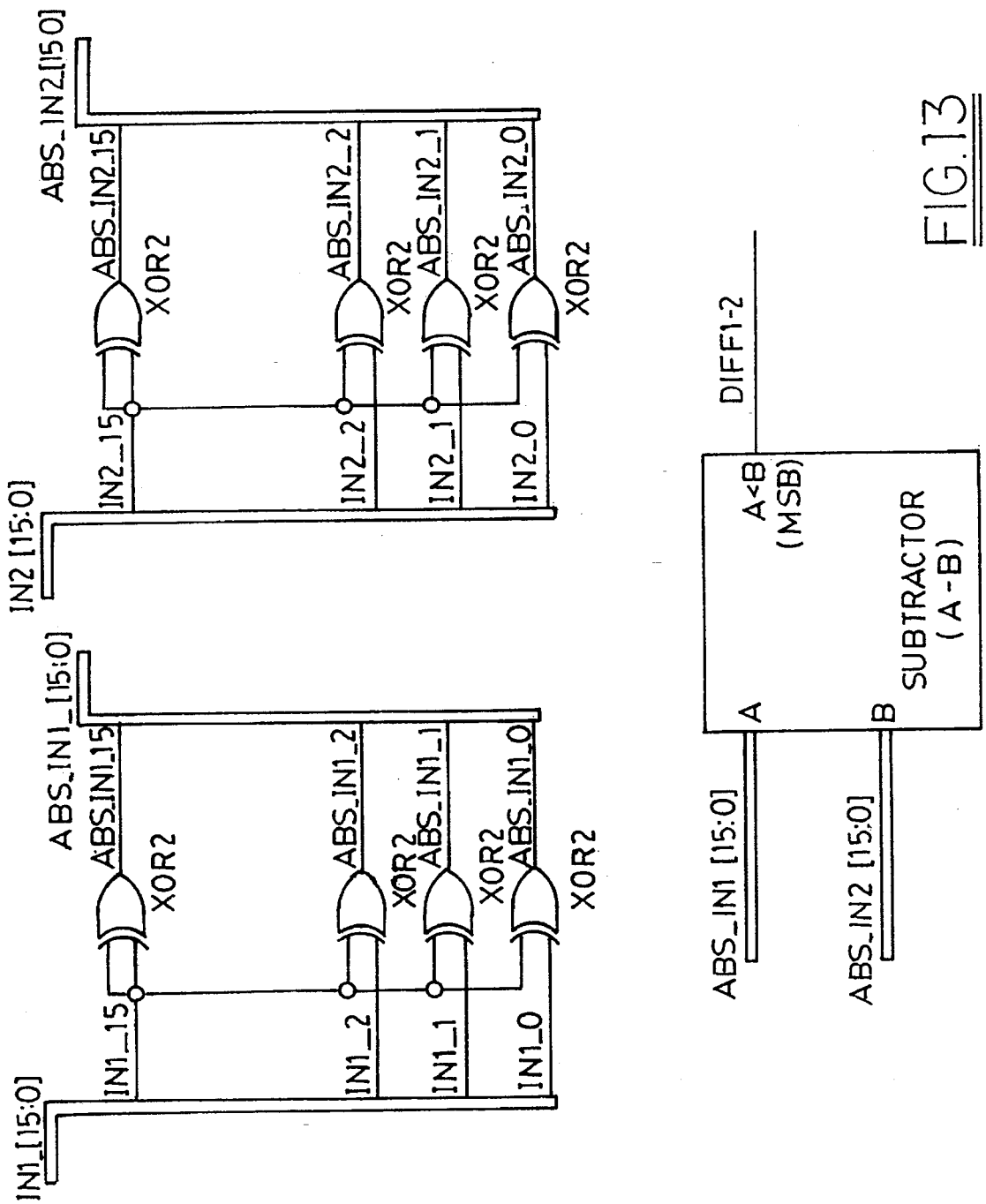

FIG. 13 is a logic diagram of an absolute comparator.

Figure 14:
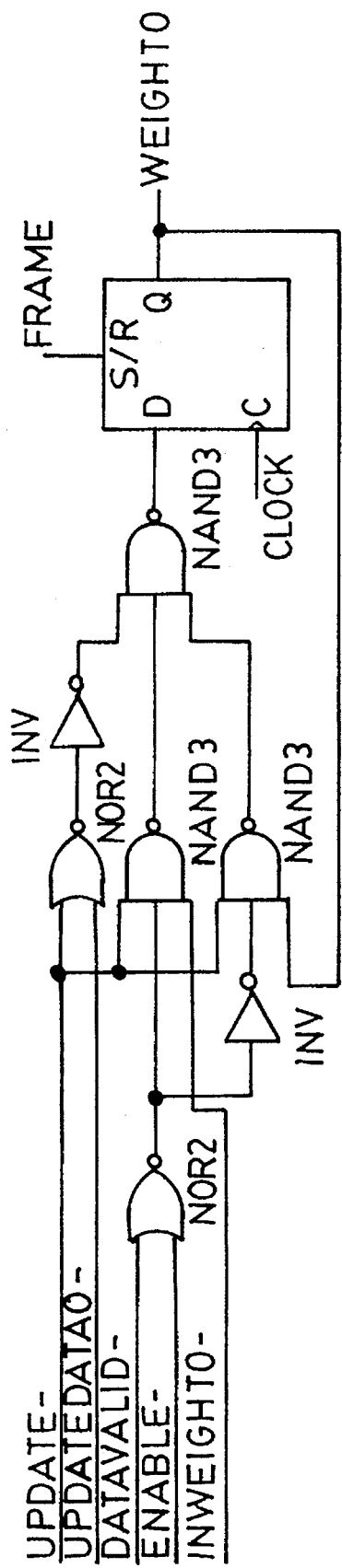
Figure 14:
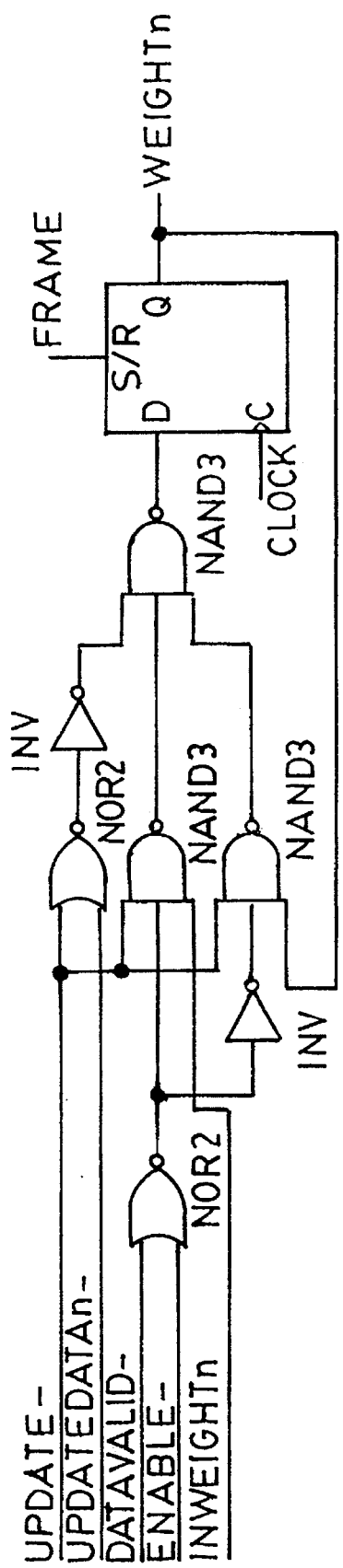

FIG. 14 is a logic diagram of the weight register circuitry associated with each bit in the 16 bit weight register.

Figure 15:
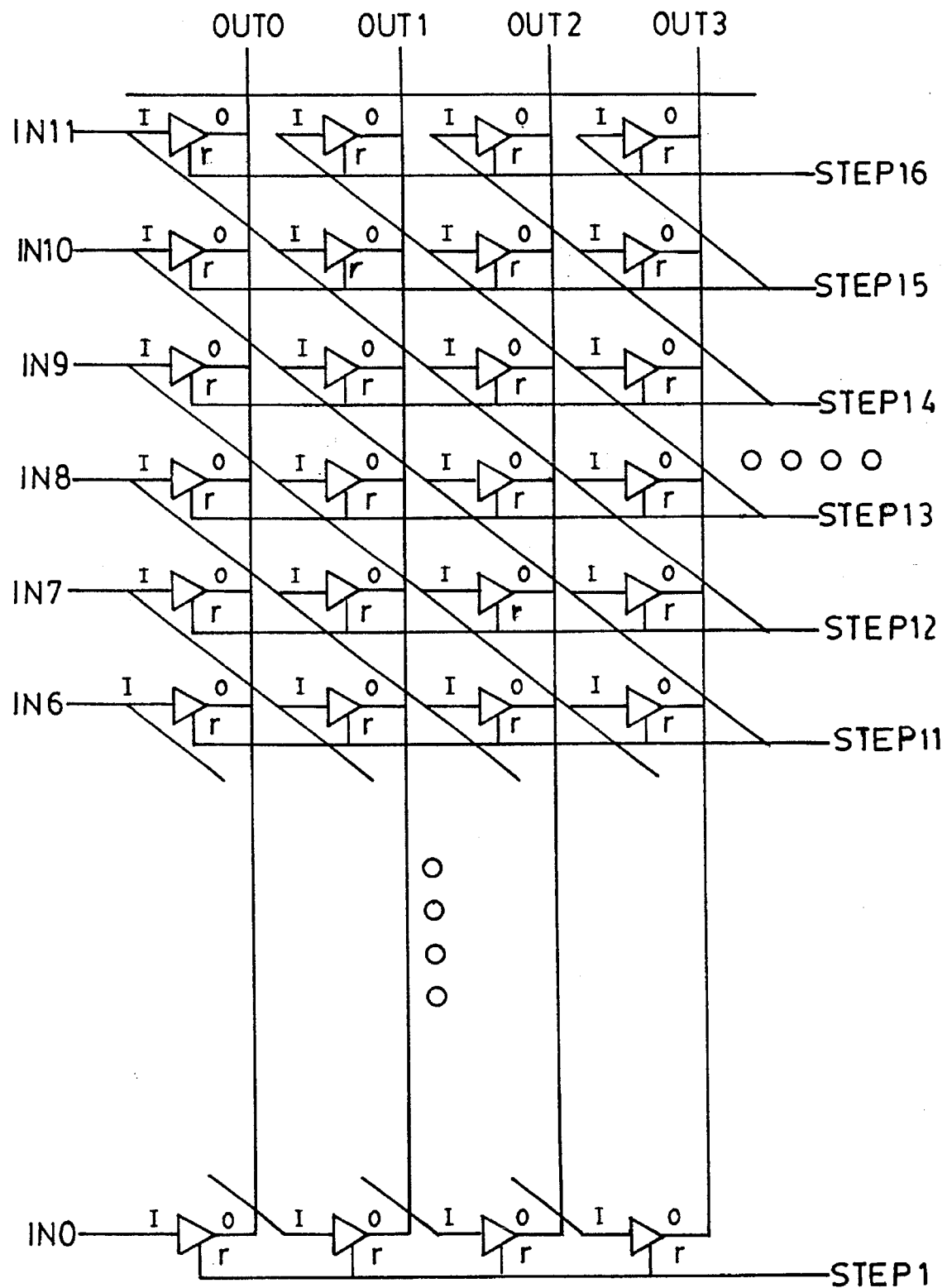

FIG. 15 is a logic diagram of a barrel shifter.

Figure 16:
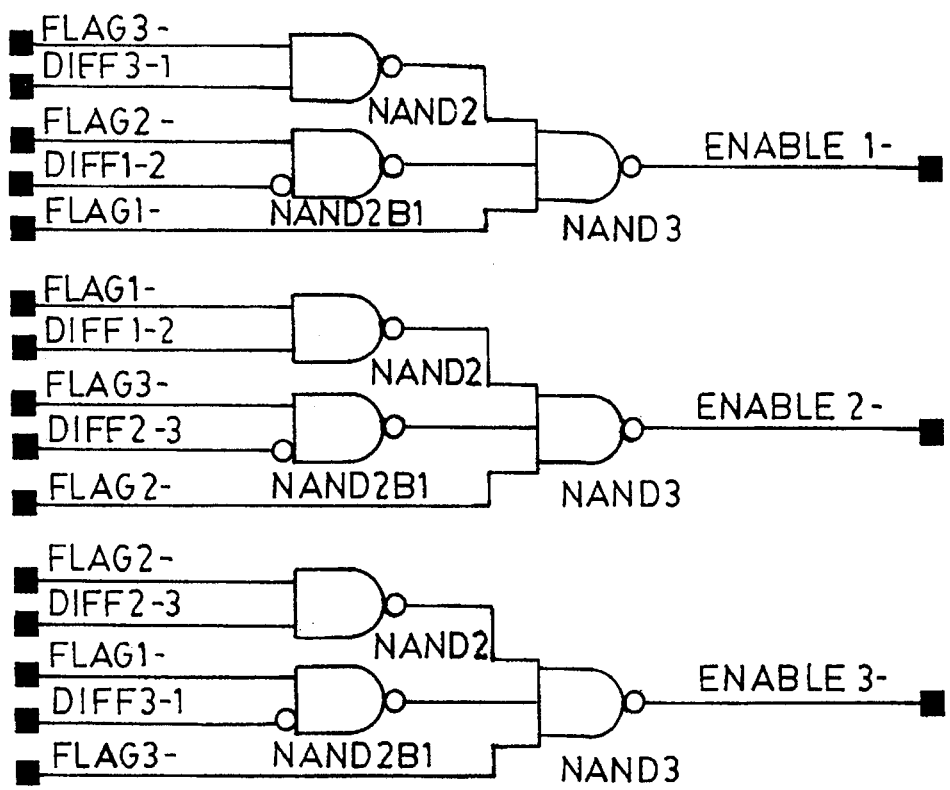

FIG. 16 is a logic diagram of nearest weight selector logic circuitry.

Figure 17:
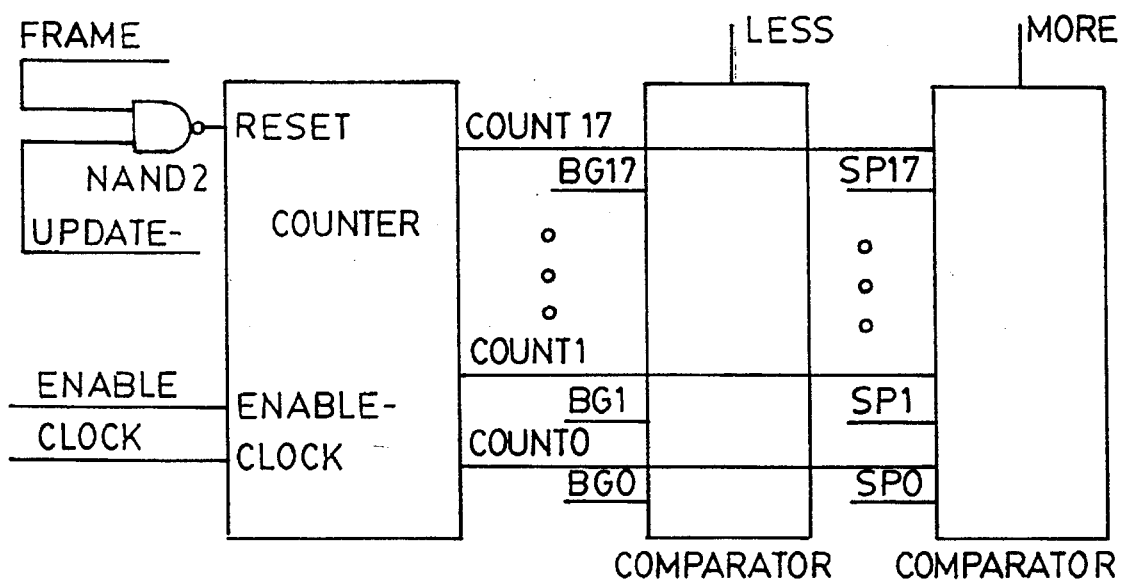

FIG. 17 is a logic diagram of a weight counter circuit.

Figure 18:
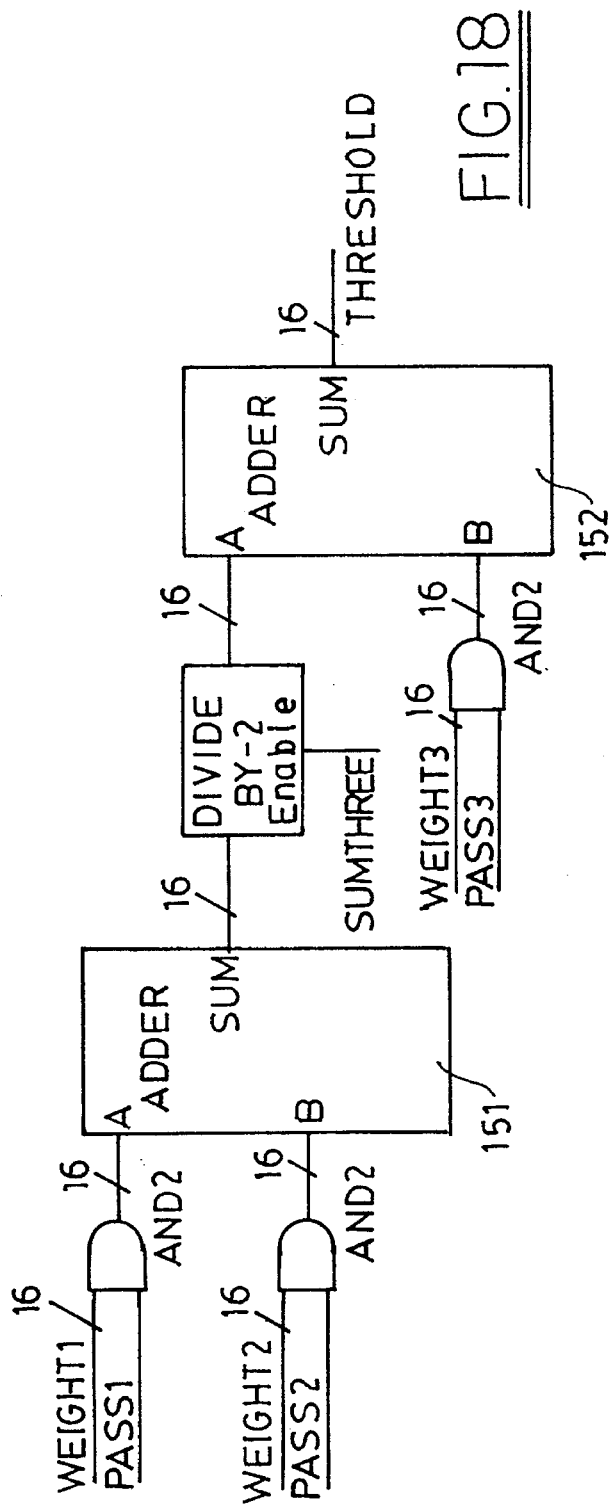

FIG. 18 is a logic diagram of the threshold circuit.

Figure 19B:
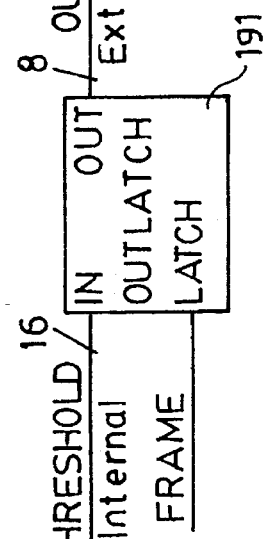

FIG. 19(*a*) 19(*b*) are schematic diagrams of the input/latch and the output (threshold) latch, respectively.

DETAILED DESCRIPTION

The thresholding problem can be considered as the problem of dividing the pixels in an image into two groups, viz. foreground and background in an optimized way. One criterion for this optimization is the distance of the threshold from both the groups of the pixels. In other words, if the gray positions of the foreground cluster and the background cluster in the histogram can be evaluated, the optimum threshold can be calculated from these cluster positions. So the problem reduces to that of finding the positions of the two pixel clusters.

Figure 1:
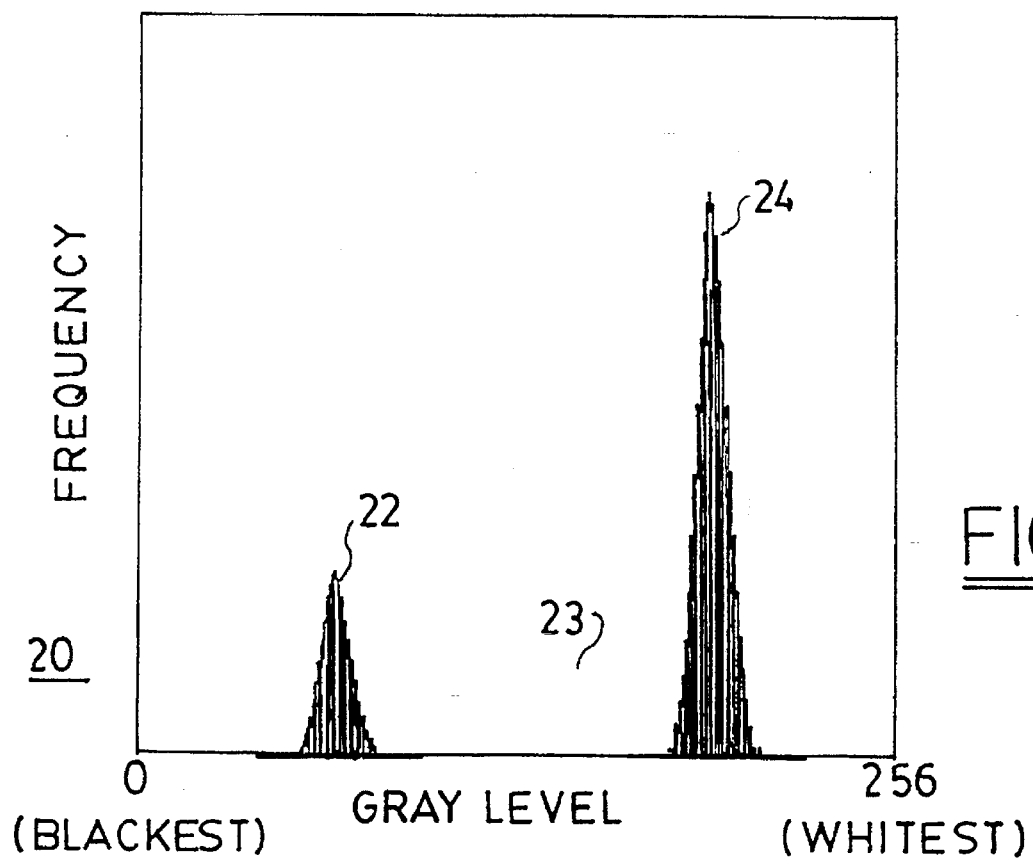
FIG. 1 is a graph of an ideal histogram.
Figure 2:
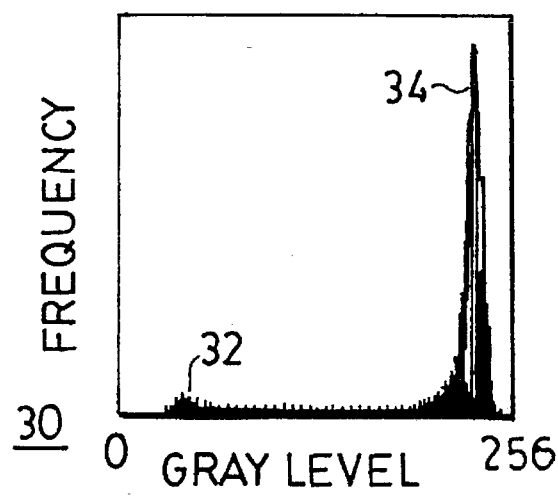
FIG. 2 is a graph of a low contrast histogram.
Figure 3:
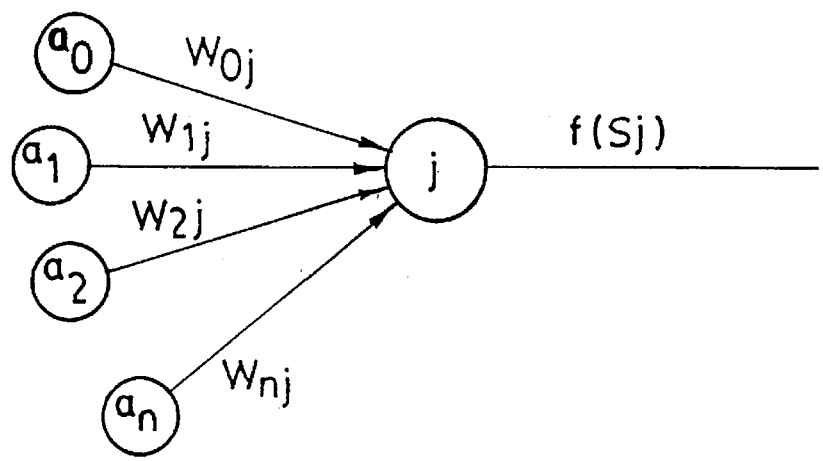
FIG. 3 is a schematic of a single layer neural network.

The basic property of an artificial neural network is that of classification. The information in a neural network resides in weights. For a given input sample the value of an output node is obtained by taking a weighted sum of the input using these weights. A single node with the input connections are shown in FIG. 3. The inputs arrive from the left and each incoming interconnection has an associated weight. The indices indicate that the weight is the weight associated with the interconnection between the $i^{th}$ node of the input to the $j^{th}$ node of the output layer. To compute the output of the node, a weighted sum of the inputs is performed and a nonlinear function is applied to the sum to produce the output. The sum is obtained as $$S_j = \sum_{i=0}^{n} a_i w_{ij}$$

where $a_i$ is the output value of the input node i and n is the number of input nodes. The output of the node in the output layer is obtained as $f(S_j)$ where f is a nonlinear function.

Figure 4:
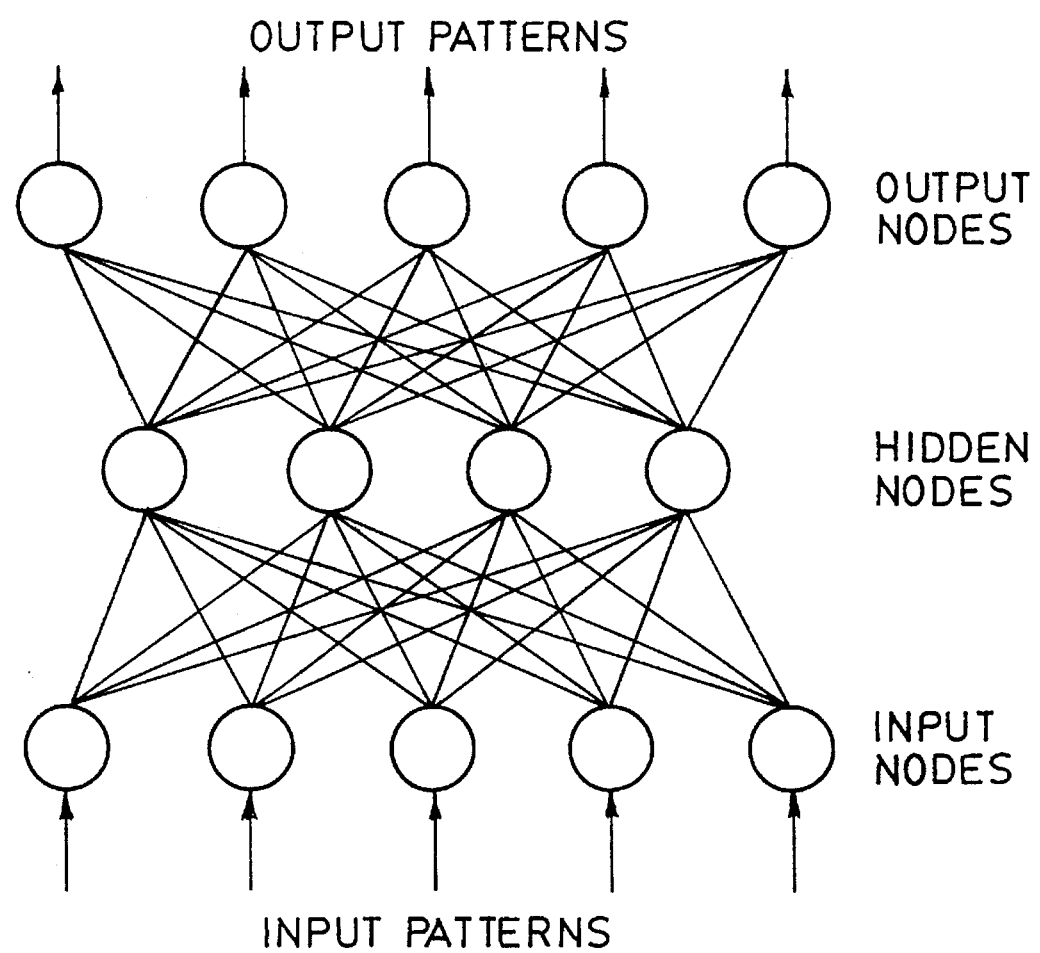
FIG. 4 is a schematic of a multiple layer neural network.

A multilayered network is constructed using multiple nodes arranged in a layered structure where the nodes of a given layer is connected to the nodes of the preceding and the succeeding layers only. FIG. 4 shows a three layer neural network.

During the training of the network, its weights are modified by the input values. As the network stabilizes after a number of input training samples, the weights arrange themselves such that a specific output node responds to a particular class of input. The training process can be of two types, supervised and unsupervised. In supervised training, the class to which a given input belongs is known beforehand. During the training period the net is given the input-output pair. The weights are modified such that the next time the specific input pattern is presented, proper output pattern is generated. In the simplest training rule the change of the weights is proportional to the difference between the output value produced by the node and the target value of the node. The change is also made proportional to the input value of each weight. The proportionality constant, is defined as the learn-rate. The weight update procedure for every input-output pair can be stated as $$w_{ij}^{new} = w_{ij}^{old} + C(t_j - X_j) a_i$$

where

C=learn-rate constant (0<C<1)

$t_j$=the target value of the output unit j $X_j$=the output value produced by the output unit j $a_i$=the value of input unit i Initially the weights are set to small random numbers. The update process is continued for each pair of training patterns. The training process can be terminated using different criteria for convergence of the weights. The error in the output is the difference between the computed value and the expected value. The mean square error computed over a number of training patterns can be used as a terminating criterion. The network can be assumed to have converged to a steady state if the mean square value is zero or very small. A limit on the number of the training patterns can be imposed to stop the training from continuing infinitely in absence of convergence. A modified version of this method, called the backpropagation technique is used for multilayer networks.

The supervised training can be done when the expected output for every input pattern is known. If the input classes are not known a priori the network uses an unsupervised technique. In the unsupervised learning technique, the net is given only the input pattern. The weights are updated using a competitive learning paradigm. In this method, initially weights are set to random numbers. For every input pattern, weighted sum is calculated for each output node. The node which has the maximum value is considered as the winner. Only the weights going to the winner are updated. The updating procedure can be described as $$w_{ij}^{new} = \begin{cases} w_{ij}^{old} + C(a_i - w_{ij}^{old}) & \text{if } S_j > S_k \text{ for all } k, k \neq j \\ w_{ij}^{old} & \text{otherwise} \end{cases}$$

where

C=Learn-rate constant(0<C<1.0)

$S_k$=Output of the k-th output node and the node j is defined as the winner.

Figure 5:
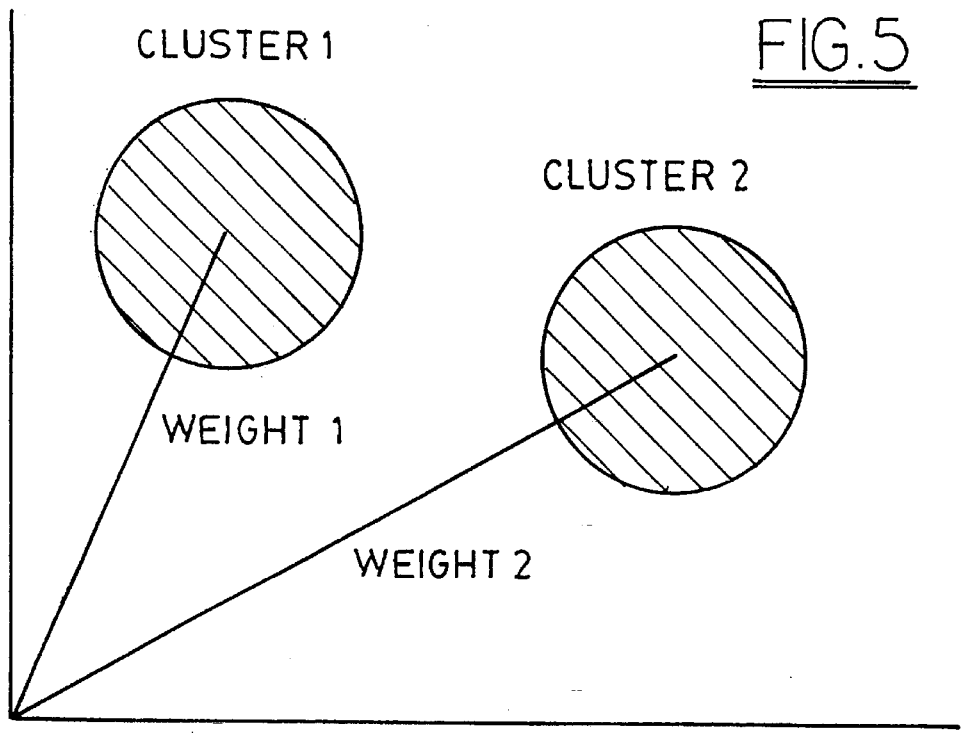
FIG. 5 is a graph showing cluster locations for two weights.
Figure 6:
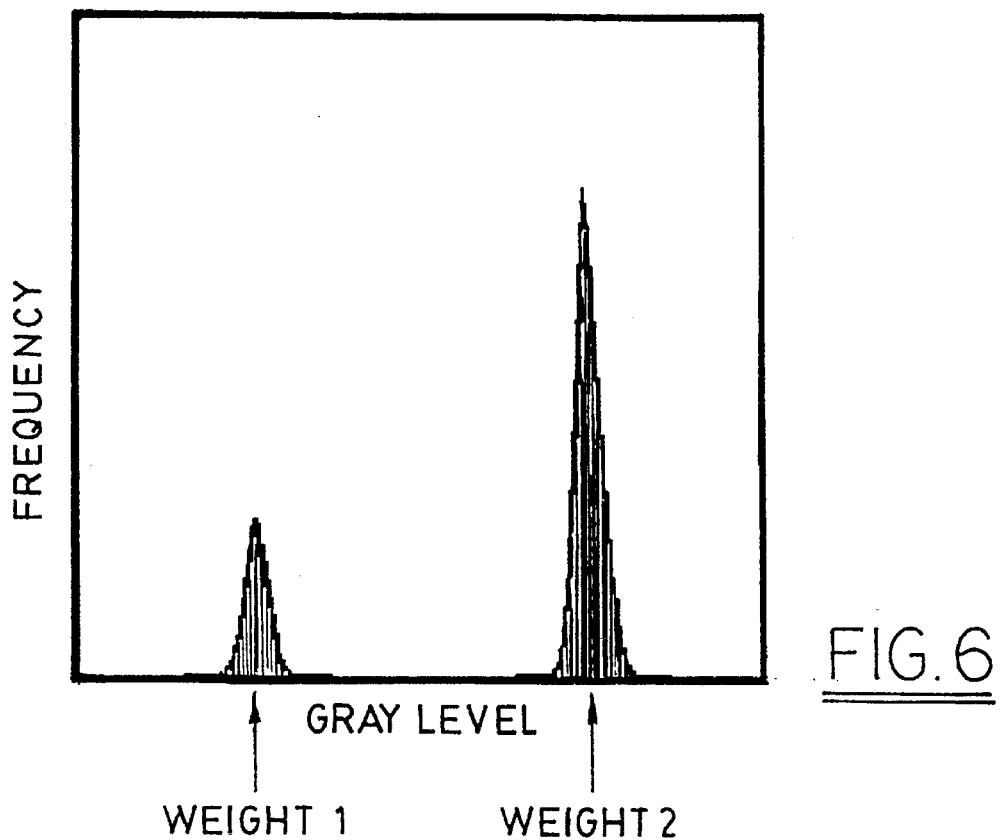
FIG. 6 is a histogram corresponding to FIG. 5.

In other words, the node whose weights are similar to the input pattern wins the competition and the update process changes the weights connected to that node such that the difference is decreased. The updating process of each weight is such that the next time the same input pattern is presented, that node will be the winner. As different input patterns are presented, different weights will be updated. After a number of input patterns, one weight will be the winner for a set of similar input patterns. Thus if the input patterns consists of distinct classes, one output node will be the winner for the inputs from a class and the weights going to the output node will represent one class of inputs. The weights and their relation to the inputs becomes clearer if a vector-space approach is used for their representation. If the input is N-dimensional, each weight vector is also N-dimensional. If the input has distinct classes, each class can be represented as a cluster in the N-dimensional space. During the training process, for a given input pattern, the nearest weight is pulled towards the cluster to which the input belongs. As the training progresses, the weight vectors tend to move towards the centroids of these clusters. The training of a net is convergent if the weight changes decrease as the training process progresses. If the weight changes are always less than a pre-specified small value, the net is considered fully trained. In a trained net, the weight vectors are representative of the input classes. FIG. 5 shows the distribution of a 2-dimensional input pattern. The distribution shows two distinct groups of input patterns. If a 2 weight neural network is trained to classify these input patterns, where each weight is a 2-dimensional vector, the final value of the weights after convergence will be at the centroid of each cluster. The value of a weight is such that the average distance from the pixels of the corresponding cluster is minimized. FIG. 6 is the histogram corresponding to the weight results of FIG. 5.

Figure 7:
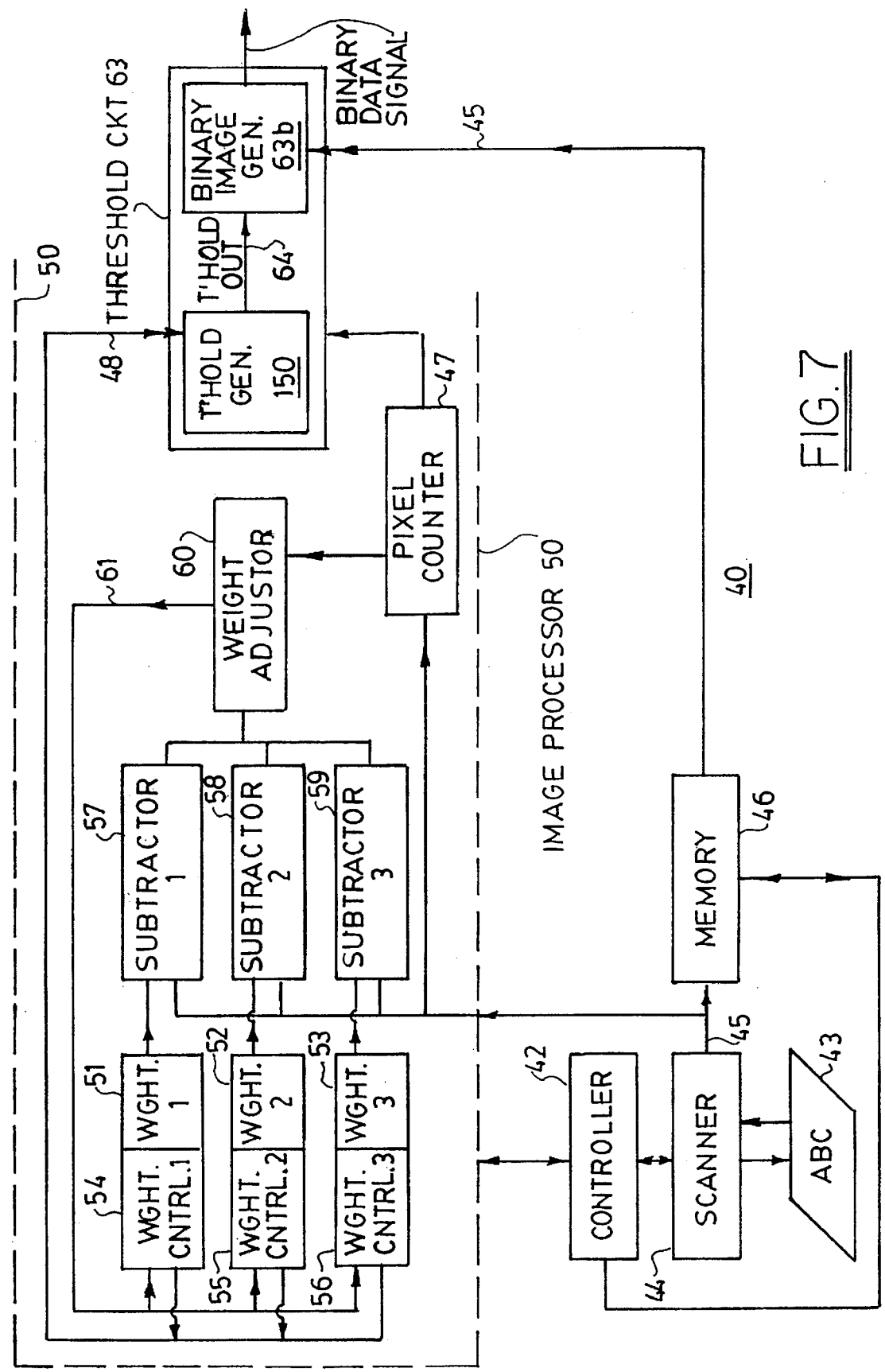
FIG. 7 is a schematic diagram of an image processing system.

Turning to FIG. 7 there is shown an image processing system 40 using the invention. A controller 42, such as a personal computer, work station or main frame computer, provides a set of controls signals for operating a scanner 44, a memory 46, and a neural network image processor 50. The image processor 50 has three weights 51, 52, 53. Each weight has a counter 54, 55, 56, respectively coupled to the weight. A document 43 passes the scanner 44 which generates a series of gray level pixel data signals 45. A memory 46 stores the pixel data signals 45. Three subtractors 57, 58, 59 also receive the pixel data signals 45 as well as weights 51, 52, 53, respectively. A weight adjustor 60 determines the weight closest to the pixel data signal and provides and updates the closest weight by adding (or subtracting) weight to one of weights 51, 52, 53 via update signal line 48. A pixel counter 47 counts each pixel processed. Weight counters 54, 55, 56 count each time the weights are updated. After the last pixel is processed, a thresholder 63 uses the final weight values 51, 52, 53 to generate a threshold signal. The stored pixel data signal 45 are input to the thresholder 63 which outputs a series or binary data signals 64. The thresholder circuit 63 takes the average of the three weights 54, 55, and 56. A threshold generator 150 generates a threshold signal 64. A binary image generator 63b receives the threshold output 64 and compares it to the pixel data signals stored in memory 46. The binary image generator has an output signal comprising a series of binary data signals indicating whether the compared binary data signals are greater than or less than the threshold data signals 64. Those data signals less than the threshold signal are background (white) pixels and those greater than the threshold are foreground (black) pixels.

The image processing system 40 uses the classification property of the neural network 50 to solve the problem of computing threshold. The basic assumption behind the use of thresholding is that the image has distinct classes of pixels which can be divided into two groups. The neural network 50 classifies the input pixels. Unsupervised training is done using all the pixels of the image of document 43 whose threshold is to be computed. At the end of the training pass, the weights 51, 52, 53 of the network represent the centroids of the pixel groups. The threshold can be computed using these centroid values. FIG. 6 shows the ideal histogram with the weights of the network after convergence.

If the image of document 43 consists of two distinct classes of pixels, a very simple network is sufficient. The net will have need only two of the weights 51, 52, 53 to represent the classes. The updating procedure is also gets simple. For every input the nearest weight is selected for update. The update is done by adding the difference between the selected weight and the input to the weight. The difference is scaled by a factor residing in the weight adjustor 60 and defined as learn-rate, before it is added to the weight. This process is repeated for each pixel of the image. As the training progresses, the weights tend to the centroid of each class of pixels. At the end of the image, the threshold is computed by taking an average of the two weights, which separates the two groups equally.

The convergence of the network 50 depends on the selection of the learn-rate. In the beginning, the weights may not be near the centroids. If too small a value is selected for the learn-rate, the weights may not reach the centroid values. On the other hand, a larger value will result in large swing in the weight values and convergence may not be achieved. Moreover as the training progresses the weights tends to their steady value. In a partly trained net, large weight changes are caused only by spurious inputs. So the learn-rate is decreased as the training progresses to facilitate convergence of the network. The initial value as well as the rate of reduction of the learn-rate is dependent on the application.

Figure 8:
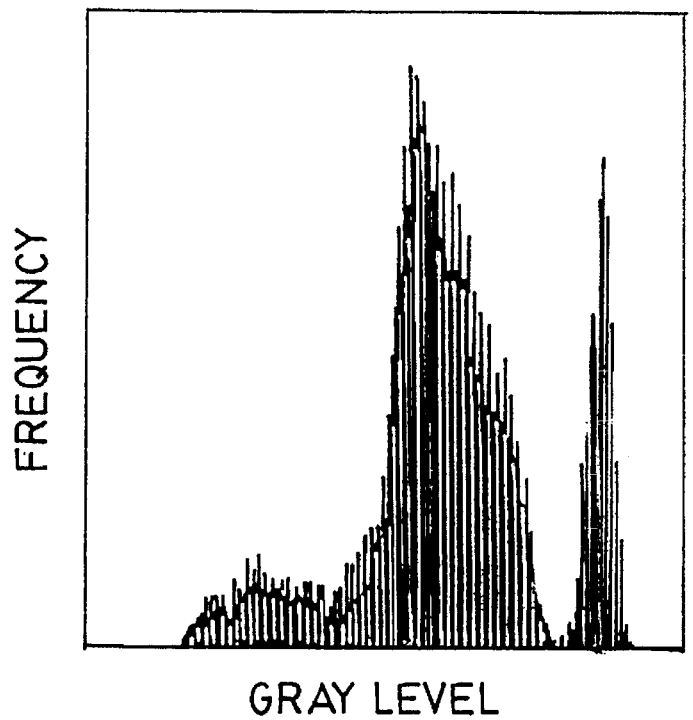
FIG. 8 is a trimodal histogram of an address block with a dark background.

A number of features in network 50 to improve its performance. A major drawback of majority of the existing systems is their inability to find an optimum threshold of images with trimodal histograms. Considering a number of real address-block image of mailpieces, it is seen that the number of trimodal images is not very infrequent. FIG. 8 shows an address block with a trimodal histogram. The third peak is due to the background pattern present. The optimum selection of the threshold must be able to consider the background pattern as a part of the background. If the network with only two weights is used for such images, the weights may not converge towards the centroids of the foreground text and background. To find the optimum threshold in such an image, the network 50 uses all three weights 51, 52, 53 to detect a third cluster of pixels.

The presence of a third weight makes the threshold computation complex. The presence of a third peak can be because of the presence of two levels of text in the foreground or presence of background pattern. A number of parametric decisions are needed to obtain the optimum threshold. To determine whether a peak is due to foreground or background, characteristics from the input will have to be used. In the application for thresholding address blocks on mailpiece images, the number of pixels representing the foreground is very small and this can be used as a distinguishing criterion. First, considering the case when the image consists of only two pixel classes. If the clusters are narrow, then only two of the weights will be updated most of the time and they will represent the two pixel classes. The third weight will be updated for a very small number of times during the initial stage of the training. The optimum threshold can then be selected by taking the average of the first two weights. On the other hand, if the image is not sharp the pixel clusters will not be narrow. In such a case none of the weights can be disregarded. All the three weights are to be taken into consideration to compute the threshold. When the image has three peaks in its histogram, the three weights will represent a pixel cluster each. A decision has to be made to choose the foreground and non-foreground clusters to compute the threshold. For the purpose of thresholding address blocks on mailpieces, the number of times a weight is updated, defined as weight-count, is used as a measure. After the whole image is processed, the weight-counts are compared to two parameters spurious-pixel-limit and background-pixel-limit. The spurious-pixel-limit is used to separate the foreground text from non-text foreground. If a weight is updated less than this parameter, that weight is not taken into consideration for threshold computation. In address blocks, the foreground text generally occupies a certain percentage of the image. Any background pattern covers a comparatively larger area. So the background-pixel-limit is used to differentiate the clusters due to foreground text from that due to background pattern in case of trimodal images. Any weight whose corresponding weight-count is more than the background-pixel-limit is considered as a background pattern. To make the network 50 independent of the image size, these parameters are defined in percentage of the image size. For simplicity, another assumption made was that the foreground is always darker than the background. For application where such assumption is not always true, the thresholding computation must be modified.

Another major consideration is the selection and change of the learn-rate by weight adjustor 60. The decrease in the learn-rate can be accomplished in two ways—continuously or in steps. Continuous decrement of the learn-rate requires its computation for every pixel, which is computationally exhaustive. The process can be simplified by changing the learn-rate only in steps. The image size is divided into a number of blocks and the learn-rate is decreased after each block is processed. Simulation shows that the gradual change of the learn-rate does not have any performance advantage over step changes.

Figure 9:
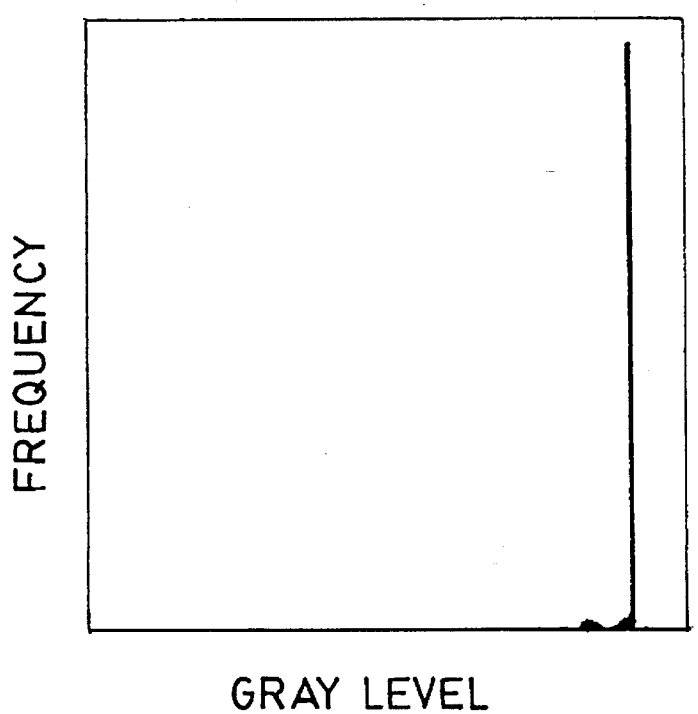
FIG. 9 is a histogram of a low contrast image.

Another characteristic that was observed on address block images was a large variation of contrast. Any thresholding method should be independent of the contrast of the image. Generally a neural network uses random initial value for the weights. It was found that using random values does not give any increase in performance as compared to fixing the initial weights. Since use of a random number is more complex for implementation than using fixed value, the network 50 uses fixed values as the initial weights. If the image is of very low contrast, the image clusters will be very near to each other. FIG. 9 shows a histogram of such an image. The histogram shows that the pixels are confined to a very small range. In such a case only one or two of the weights 51, 52, 53 will be updated. The other weight will not be updated at all. To perform efficiently with such low contrast images, a contrast checking is done when half the image is processed. An assumption is made that the first half of the image has similar characteristics to that of the second half. Such an assumption needs to be satisfied for a single optimum threshold to exist. The weight-counters are compared to the spurious-pixel-limit and if a low contrast condition is detected, the weights are updated to fixed values depending on the position of the pixel clusters. For example, if the weight 51 is not updated at all, then the weights are shifted towards the upper two-third of the gray scale and the updating process is continued. In case of extremely low contrast, i.e. when only one of the weights is updated, one of the weights is flagged inactive and only the other two are used after initializing to new values. For subsequent pixels, the net behaves as a two weight net. In such extremely low contrast images, there will not be three distinct peaks in the histogram. So the use of three weights will degrade the performance. The final computation of the threshold takes the flagging into account and does not consider the flagged weight for threshold computation. Once the threshold is computed, the image is binarized in thresholder 63 by comparing each pixel to the threshold.

ASIC Embodiment Using Weight-based Clustering Technique

With reference to FIG. 10, the invention uses simple arithmetic operations that are implemented in standard cells available for ASIC fabrication. There is an inherent parallelism in the invention and that characteristic is suitable for ASIC implementation. With reference to FIG. 100, the ASIC device 10 has update circuitry including three 16 bit D-flipflop registers 110, 111, 112 for storing weight data signals, circuitry to compare the weight data signals to the input pixel and circuitry to update the weight data signal stored in each weight register 110, 111, 112. Other circuitry provides for learn-rate generation, weight counters and the threshold computation.

The D-flipflops of weight registers 110, 111, 112 are synchronously set and reset to initial values and also re-initialize when a low contrast condition is detected. The initialization values are built into the D-flipflops to minimize routing requirement. The updated value for each weight register 110, 111, 112 is given at the D-flipflops input and the actual updating of a weight register takes place when it is enabled for update. Each weight data signal is compared to the input pixel data signal. The comparison process is done in two steps. First subtractors 120, 121, 122 find the difference between the input pixel data signal and the weight data signal. The three differences obtained are compared in pair using an absolute comparator 143. The absolute comparator 143 finds the numerically smaller number of its two input numbers, i.e. the one closest to the input pixel data signal. The comparator 143 generates a weight update enable signal for that weight register. The comparison and the computation of the weight update are all performed in parallel. The difference for each weight is scaled by a learn-rate and added to the weight data signal value to obtain the updated weight data signal. Though the updated weight data signal for each of the weight registers 110, 111, 112 is computed, only the weight that is enabled for update is allowed to change. The other weights does not change for that pixel.

While it is possible to continuously change the learn rate, we have found that it is more efficient to change the learn rate in steps. By proper selection of the learn-rate, the scaling process on the differences is implemented as shifting operation. Barrel shifters 130, 131, 132 are used for this purpose. The learn-rate factor is implemented as a counter 135. The counter 135 is updated after a certain number of pixels are processed. This number is made dependent on the image size to make the number of learn-rate changes for an image a constant. This counter 135 output is used to detect the condition when half the image is processed. This condition is used in the low contrast checking.

Each weight register 110, 111, 112 is assigned a corresponding update counter 160, 161, 162. Whenever a weight is selected for update, the corresponding update counter is increased by one. The invention has a spurious-pixel-limit and background-pixel-limit. Both limits are selected such that they are obtained by shifting the size. The counters 160, 161, 162 are compared to shifted versions of the size to detect 'more than spurious-pixel-limit' or 'less than background-pixels' conditions. These conditions are logically combined with the half-image signal to generate the update signal when half the image is processed. These signals are also used to enable the proper low contrast re-initialization of the weights. The size is stored in a register which is to be loaded externally at the start of each image.

The threshold circuit 150 derives a threshold signal for each pixel data signal in parallel. As shown in FIG. 18, two adders 151, 152 generate a signal representative of the average of the three weight data signals. Since the weights to be used for averaging depends on the weight-counter values, the more than spurious-pixel-limit and the 'less than background-pixels' condition signals are used to enable the adder inputs such that only the required weights are used for computing the average. The threshold computation is held at the final value when the image is completely processed and allowed to continue when a new image is started.

With reference to FIGS. 7 and 10, the process is controlled by two external signals, defined as frame and datavalid. The frame signal indicates the presence of an active frame. If this signal is inactive, the complete system is kept at reset condition. The circuit starts operating only when the frame signal is high. Controller 42 activates the frame signal at the beginning of each image and make it inactive when the image is completely processed. The datavalid signal is provided to facilitate real-time image data, where pixels may not arrive continuously. For example, the pixels may be arriving with gaps between each line to account for a retrace time. The datavalid signal is in effect only when the frame signal is activated. The weights and the counters are updated only if the datavalid is active. Otherwise the circuit is kept in a hold condition.

The circuitry needs the size value to be loaded into a register at the beginning of every image. If the input sizes vary over a large range, this size may be loaded by controller 42. In applications where the image size is known to remain more or less constant, external hardware can be made to load the size register whenever the frame signal is inactive. This can be done because the ASIC image processor 10 does not depend on the exact value of the size, rather an approximate value.

As an image is processed, the learn-rate is decreased. Since the multiplication of the learn-rate is implemented as shifting operations, this results in a larger shift of the differences. We have found that eight (8) steps of learn-rate change are required for efficient thresholding. Considering the input pixels to be byte sized, the ASIC 10 needs a 16-bit representation for proper convergence of the weights. So the weight registers 110, 111, 112 are made 16-bit long. The adders 140–142, subtractors 120–122, comparator 143 and the shifters 130–132 are also designed to work with 16-bit data. The threshold adders are also 16-bit, but only the 8 most significant bits of the sum is taken as the threshold.

As the differences can be either positive or negative, the internal data representation needs to handle signed arithmetic. Since both addition and subtractions are required, 2's complement arithmetic is used for internal representation. This makes the subtraction and comparison easily implementable using adders. Also a simple barrel shifter can be used for shifting of the signed difference.

The implementation is intended for address blocks, which are generally less than 1 Megapixels. To accommodate the largest image, the size is represented in 20 bits. But as the internal circuitry needs to know only one fourth the value of the image size to check for the low-contrast condition and selection of weights for threshold computation, the size is stored in an 18-bit register.

The detailed design of the logic blocks are discussed below.

Adder: As shown in FIG. 10, each adder 140,141,142 has a carry delay. Since the adders 140,141,142 required for the method are 16-bit wide, carry delay is significant. Though the carry look ahead adders have low carry delay, they need a large number of gates to generate the carry in a look ahead fashion. Because of the chip area constraint, a ripple carry scheme is used in adders 140,141,142. It shows an invertor at the output of the carry-out signal. An alternative structure is used where this invertor is not used. Instead, the inputs and the outputs at the next bit are inverted. Though this introduces an invertor in the data inputs, this is not significant in comparison to the total carry chain delay.

Subtractors 120, 121, 122: In 2's complement arithmetic, subtraction is equivalent to an addition with one of the operands bits flipped followed by an addition of 1 to the result. So, the subtractors 120, 121, 122 are adders with addition of an invertor at one of the inputs together with a logic one input at the carry input of the least significant bit (LSB). As in the adder, the delay introduced by the invertor at the input is insignificant in comparison to the carry-chain delay. The block schematic of the subtractor is shown in FIG. 12.

Absolute Comparator 143: The invention uses a comparison of two 2's complement numbers. The operation of comparing the absolute magnitudes of the subtractor outputs is performed in two stages, first computing the absolute value of the numbers and using a subtraction operation on the absolute values to find the one that is smaller. The absolute value of a 2's complement number can be found by taking 1's complement and adding a 1 to it. So a generalized scheme to find the absolute value is to Exclusive-OR each bit with the most significant bit (MSB) and adding the MSB with the result. Such an implementation in this fashion requires two stages of addition, one at the absoluter and next at the subtractor as shown in FIG. 13. To optimize the speed, a modification is used in the comparison scheme. Instead of considering the numbers as 2's complement, they are considered as 1's complement. With this assumption, the absolute value is found by just Exclusive-OR each bit with the MSB. The addition of 1 is not used. So the comparison operation is done with one 16-bit subtraction instead of two. The assumption introduces an error equal to the LSB. But this error cancels out if both the numbers being compared are of the same sign. Moreover, if the numbers are equal, one of them is considered to be smaller. Since this is equivalent to having two weights at the same distance from the input, any one of them can be considered for updating. Another factor which effectively reduces the error possibility is the fact that the weights are represented internally using 16 bits, whereas the input values use 8-bits. So an error at the LSB internally is equivalent to an error in the comparison when the weights differ by just $1/128$th of a gray level. Since weights represent an average value over a large number of pixels, this error can be neglected. The schematic is given in the FIG. 13.

Weight Registers 110, 111, 112: The weight registers 110, 111, 112 hold data signals of the updated weights. The schematic representation of the weight circuitry is shown in FIG. 14. The implementation uses D-flipflops with synchronous set-reset. The frame signal is used to set or reset the weights to the initial values. The initial values are hardwired to decrease storage, decoding and routing requirement. The D-flipflops are enabled using an enable signal which is generated using the datavalid and the enable from the nearest weight detection circuitry. Thus only the nearest weight value gets updated when the input data is valid. The updated data is presented at the input using a 2-1 multiplexer. The other input to the multiplexer is the low-contrast condition update value. If the circuitry detects a low contrast condition at half of the image, a low-contrast-enable signal is activated. This signal is used to control the multiplexer. Since there are five different low contrast cases, five different sets of values need to be stored for each weight. Again from the storage, decoding and routing considerations, these values are hardwired into the weights. To avoid the larger circuitry of the 5-1 multiplexer, tri-stated gates are used to generate these low-contrast-update values. The inputs to these gates are hardwired to the required bit patterns and they are enabled according to the specific low-contrast condition.

Shifters 130, 131, 132: The update value for the weights are computed by adding the difference after scaling by the learn-rate. To simplify the scaling operation, the learn-rate has be constrained to be reciprocal of powers of two. Experience shows that an initial value of $1/16$ with 16 steps of decrement is sufficient. In each step, the learn-rate is decreased by a factor of two. A scaling by a factor of two is equivalent to shifting. Since the shifted output is needed in less than a clock cycle, barrel shifters 130, 131, 132 as shown in FIG. 10 (see logic diagram for barrel shifter, FIG. 15) do the shifting. Since the shifting is always towards right, sign extension is used to preserve the sign information. The shifters 130, 131, 132 are optimized to perform shifting by 4 to 16. The amount of shifting is controlled by decoding the learn-rate counter. The counter is initialized to zero. The size of the image is divided into 16 blocks and the counter is increased at the end of each block. If a low-contrast condition is detected, the weights are re-initialized. For proper convergence of the weights, the learn-rate needs to be updated to 1/32. For good contrast images, the convergence is observed to achieve in 8 steps. But 8 steps are needed for convergence after a low-contrast condition is detected. So a total of 16 steps are necessary. The shifter is implemented using tri-stated gates arranged in a array formation.

Learn-rate counter 135: The learn-rate is implemented in the shifters 130, 131, 132 and is selected using the outputs of a counter 135. Since sixteen (16) steps of learn-rate change is implemented, a 4-bit counter is used for this purpose. It is reset by the frame signal which results in a learn-rate of 1/16 in the shifter. The counter is incremented after every block of image is processed. The blockend signal is generated in the step counter. If a low-contrast condition occurs, the counter is set to 1, which makes the effective learn-rate 1/32.

Step counter: The image is divided into 16 blocks and the learn-rate is changed for each block of image pixels. The step counter 138 is loaded with a 1/16th of the size and decremented at every pixel. When the counter reaches zero, a blockend signal is generated and the counter is reloaded with 1/16th of the size. The size register value is used to form the reload value. The blockend signal is used to reload the step counter and to increment the learn counter.

Nearest weight selector: The differences are compared in pairs using absolute comparators. These comparison results are necessary and sufficient to find the smallest absolute difference. A nearest weight selector logic decoder 144 is used to determine the weight to be updated and enable it. If a very low-contrast is detected, only two weights are used and the third weight is flagged invalid by the contrast check circuitry. The flag condition of each of the three weights are taken into consideration in the nearest weight selector so that an invalid weight is not used. Basically it forces the decoder to choose the minimum of the two active weights regardless of the value of the third weight. See FIG. 16.

Contrast Check: A low contrast check is made at half of the image. The halfimage signal is generated when the learn-rate counter 135 indicates the eighth step. At half of the image, the results of comparison between the weight-counters and the two parameters, spurious-pixel-limit and background-pixel-limit are used to generate the update signal. If a low contrast condition exists, the low-contrast update signal loads the weights with the update values. The specific update pattern is enabled by the comparison results. In case of a very low contrast condition, one of the weights is flagged invalid. The other two weights are initialized to a specific value depending on the weight-counter comparisons. The contrast checking and update if necessary is done in a single clock cycle. The normal processing continues from the next clock cycle with the new weight values.

Weight counters 160, 161, 162: Weight register 110, 111, 112 are associated, respectively, with counters 160, 161, 162. Each counter 160, 161, 162 as shown in FIG. 17 counts the number of updates for each weight register 110, 111, 112. The update enable signal which enables the nearest weight is also used to enable the counters. They are reset to zero by the frame signal. The maximum size of images that can be processed is 1 Megapixels. The counters are basically used to compare the number of updates of the weights with the parameters spurious-pixel-limit and background-pixel-limit. The parameter background-pixel-limit is set at 1/4 of the size and spurious-pixel-limit is set at 1/256 of the size. So a maximum of 18 bits are necessary for the counters to represent the largest of the images. The parameters are obtained from a register which stores the size. The comparators are subtractors where only the carry generation circuitry for each bit is implemented in order to minimize the area except for the MSB. The counters are reset to zero if a low-contrast condition is detected at the half image.

Size register: The size of the image being processed is stored in an 18-bit register (not shown). The value stored in the size register is used to compare with the weight counters. The size register is loaded externally using a load signal. Since the loading is synchronous, the loading signal should be synchronized to the clock and should be valid for a minimum of one clock cycle. Since only 1/4th of the size is the required information, the value loaded into the register should be the value of the size shifted two bits towards right. The external circuitry is responsible to load the correct value into this register. If a low contrast condition is detected, the effective size must be halved. When such a condition occurs, the bits in the size register is shifted towards right by one bit at half the image.

Threshold generator 150: The threshold generator 150 shown in detail in FIG. 18 provides a threshold data signal that is representative of a selected average of the three weight data signals. The averaging is implemented using two adders. Weight1 and weight2 are used as the input to the first adder, whose output is added to the weight3 in the second adder. Each weight input to the adder are gated by an AND gate. The gating signals are called pass signals. These signals are generated using the weight count comparator outputs to effectively select the weight for averaging. In the case when all three weights need to be averaged, the first adder output needs to be divided by two which is not necessary in other conditions. This is implemented using a 16 bit 2-1 Multiplexer at the output of the first adder, which provides the sum or half of the sum to the next adder depending on the averaging conditions. Though the adder outputs are available for all the pixels, the threshold value is the value after the image is processed completely. The higher 8 bits of the sum are used to form the 8-bit threshold. As soon as the frame ends, the weights gets re-initialized and the threshold becomes invalid. The frame signal is used in the output latch to hold the threshold. The truth table for pass signal generation is as follows:

TABLE 1

| flag | | | more- | | | less | | pass | | | |
|---|---|---|---|---|---|---|---|---|---|---|---|
| wt1 | wt2 | wt3 | wt1 | wt2 | wt3 | wt1 | wt2 | wt2 | wt1 | wt3 | sumthree |
| 0 | 1 | 1 | X | X | X | X | X | 0 | 1 | 1 | 0 |
| 1 | 0 | 1 | X | X | X | X | X | 1 | 0 | 1 | 0 |
| 1 | 1 | 0 | X | X | X | X | X | 1 | 1 | 0 | 0 |

TABLE 1-continued

| flag | | | more- | | | less | | pass | | | |
|---|---|---|---|---|---|---|---|---|---|---|---|
| wt1 | wt2 | wt3 | wt1 | wt2 | wt3 | wt1 | wt2 | wt2 | wt1 | wt3 | sumthree |
| 1 | 1 | 1 | X | X | 1 | X | X | 1 | 1 | 0 | 0 |
| 1 | 1 | 1 | X | X | 0 | 1 | X | 0 | 1 | 1 | 0 |
| 1 | 1 | 1 | X | X | 0 | 0 | 1 | 1 | 0 | 1 | 0 |
| 1 | 1 | 1 | X | 0 | 0 | 0 | 0 | 1 | 1 | 0 | 0 |
| 1 | 1 | 1 | 0 | 1 | 0 | 0 | 0 | 0 | 1 | 1 | 0 |
| 1 | 1 | 1 | 1 | 1 | 0 | 0 | 0 | 1 | 1 | 1 | 1 |

Figure 19A:
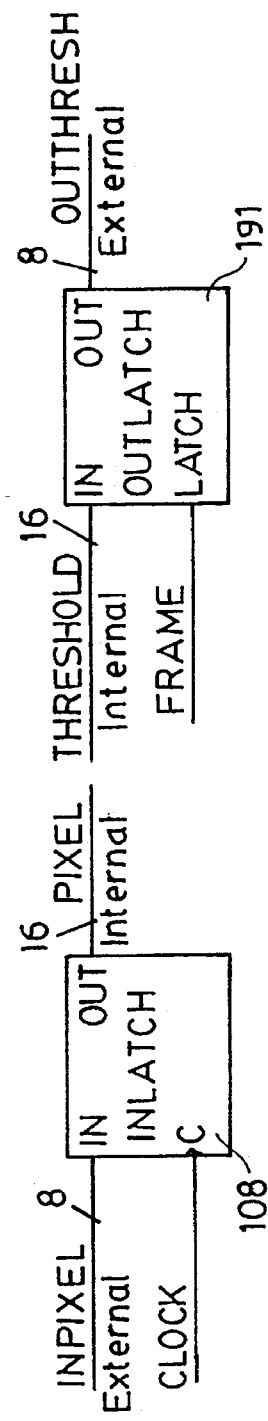

Input/output latches 108; 191: The pixel input latch of FIG. 19(a) is clocked at the rising edge of the clock so that the pixel value changes with a known reference for the internal circuitry. The output latch 191 of FIG. 19(b) of the threshold generation block is also clocked and is available as an output. The output is also latched by the frame signal such that the threshold changes continuously as the pixels are processed and at the end of the image, when frame is de-asserted, the final value is held till the next image is started. This is done in order to make the threshold available for the external circuitry until the start of the next frame.

Clocking: The I/O latches, weights and the counters use the clock. Two phase clocking is used in all the flipflops. The clock is an external input. Generally the pixel clock used in the external circuit should be used as the clock. The two phases are generated inside the chip using an inverter and a buffer. A number of buffer-inverter pairs are used to generate clock signals for different parts of the circuitry to increase driving capability.

The ASIC device 10 has been designed for a 6.8×4.6 mm frame using 2-micron scmos technology. Since the update of the selected weight must take place before the next pixel arrives, the speed of operation is determined by how fast the new value for the weight to be updated is computed. The updated value is obtained by one subtraction, one shifting and one addition operation in sequence. The worst case delay is encountered when all these operations take the maximum time. For example, the adder takes the maximum time when a carry in the LSB propagates to the MSB. The combined worst case delay was found to be less than 500 ns, which is equivalent to an operating speed of 2 MHz. Internal pipelining can be considered to improve the speed.

External circuit requirement: The ASIC device 10 needs some external control circuitry for proper operation. Though the actual need is dependent on the environment in which the chip will be used, some basic signals needed are the frame and valid data indications, pixel clock and size loading signals. To use the chip in the postal address recognition system for which the Otsu's method has been implemented, the external circuitry will be needed for system-bus interface and pixel-bus interface. The frame and datavalid and pixel clock will be generated in the image bus interface and the system bus interface can be used to load the size value.

What we claim is:

1. A method for global thresholding of image signals comprising:

scanning a document to generate a series of pixel data signals, each pixel data signal representative of the intensity of the pixel;

storing the pixel data signals in a memory;

comparing each pixel data signal to at least first and second weight signals to determine the weight signal closest to the pixel data signal;

changing the value of said weight signal closest to the pixel data signal;

counting the number of times each weight signal is changed;

averaging the changed weight signals to determine a threshold signal; and comparing the pixel data signals to the threshold signal to determine which pixel data signals are greater than the threshold signal and which pixel data signals are less than said threshold signal.

2. The method of claim 1 wherein the weight signal closest to the pixel data signal is changed by an amount proportional to the difference between the closest weight signal and each pixel data signal.

3. The method of claim 1 wherein the changes to each weight signals are reduced in proportion to the number of pixel signals compared to each weight signals.

4. The method of claim 1 further comprising the step of comparing the pixel data signals to a third weight signal, said third weight signal having a value greater than one of the first and second weight signals and less than the other of the first and second weight signals.

5. The method of claim 4 further comprising the step of increasing each weight signal when one of the weight signals is not updated after a number of comparisons of the pixel data signal to the weight signals.

6. The method of claim 5 further comprising the step of inactivating one of the weight signals when only one of the weight signals is updated.

7. The method of claim 1 further comprising the step of generating a series of binary output pixel data signals with a first set of pixel data signals indicative of foreground of the document and a second set of pixel data signals indicative of background of the document.

8. The method of claim 7 wherein the first set of pixel data signals indicates black text of the document and the second set of pixel data signals indicates white background of the document.

9. An image signal processor for separating foreground pixel data signals from background pixel data signals comprising:

means for scanning a document to generate a series of pixel data signals, each pixel data signal representative of the intensity of the pixel;

means for storing the pixel data signals in a memory;

means for comparing each pixel data signal to at least first and second weight signals;

means for changing the value of the weight signal closest to each of said pixel data signal;

means for counting the number of times each weight signal is changed means for averaging the changed weight signals to determine a threshold signal; and means for comparing the pixel data signals to the threshold signal to determine which pixel data signals are greater than the threshold signal and which pixel data signals are less than said threshold signal.

10. The image signal processor of claim 9 wherein the closest weight signal is changed by an amount proportional to the difference between the closest weight signal and the pixel data signal.

11. The image signal processor of claim 9 wherein the changes to each weight signals are reduced in proportion to the number of pixel signals compared to each weight signals.

12. The image signal processor of claim 9 further comprising means for comparing the pixel data signals to a third weight signal, said third weight signal having a value greater than one of the first and second weight signals and less than the other of the first and second weight signals.

13. The image signal processor of claim 12 further comprising means for increasing each weight signal when one of the weight signals is not updated after a number of comparisons of the pixel data signal to the weight signals.

14. The image signal processor of claim 13 further comprising means for inactivating one of the weight signals when only one of the weight signals is updated.

15. An image signal processor comprising:
a scanner for generating a series of pixel data signals, each pixel data signal having a magnitude representative of the intensity of the pixel;
a memory for receiving and storing each pixel data signal;
first and second weight registers for holding first and second digital weight data signals;
a first subtractor having one input for receiving the first weight data signal, another input for receiving the pixel data signals, and an output representative of the difference between the two inputs;
a second subtractor having one input for receiving the second weight data signal, another input for receiving the pixel data signals, and an output representative of the difference between the two inputs;
a comparator for receiving the outputs of each subtractor and having an output indicating the weight register having a stored weight data signal closest in magnitude to the pixel data signal; and
a learn rate counter coupled to the weight registers for updating the magnitude of the weight signal in the weight register indicated by the comparator as closest in magnitude to the pixel data signal by changing the magnitude of the weight data signal stored in said weight data signal register.

16. The image signal processor of claim 15 further comprising a counter for counting the number of times each weight register is updated.

17. The image signal processor of claim 16 further comprising an averaging circuit connected to the weight registers for averaging the weight data signals stored in the registers to provide a threshold data signal.

18. The image signal processor of claim 17 further comprising a binary image generator having a first input connected to the threshold data signal and a second input serially connected to each of the pixel data signals stored in the memory and having an output signal comprising a series of binary data signals indicating whether the compared pixel data signals are greater than or less than the threshold data signal.

19. The image signal processor of claim 15 further comprising a third weight register for holding third digital weight data signals;
a third subtractor having one input for receiving the third weight data signal, another input for receiving the pixel data signals, and an output representative of the difference between the two inputs; and wherein the comparator comprises an absolute comparator coupled to the three subtactors, said absolute comparator receives the outputs of each subtractor and has an output indicating the weight register having a stored weight data signal closest in magnitude to the pixel data signal.

20. The image signal processor of claim 19 further comprising means for increasing each weight signal when one of the weight signals is not updated after a number of comparisons of the pixel data signal to the weight signals.

21. The image signal processor of claim 20 further comprising means for inactivating one of the weight signals when only one of the weight signals is updated.

22. A global threshold circuit for processing a series of pixel data signals comprising:
an input for receiving pixel data signals,
first, second and third weight registers for holding first and second and third digital weight data signals;
first, second and third subtractors, coupled respectively to said first, second and third weight registers, each subtractor having one input for receiving the respective first, second and third weight data signal, and each subtractor having another input for receiving the pixel data signals, and each subtractor having an output signal representative of the difference between the two inputs;
an absolute comparator for receiving the output difference signals of the subtractors and having a comparator output indicating the weight register having a stored weight data signal closest in magnitude to the pixel data signal; and
a learn rate counter coupled to the weight registers for updating the magnitude of the weight data signal in the weight register indicated by the comparator as closest in magnitude to the pixel data signal by changing the magnitude of the weight data signal stored in said weight data signal register.

23. The global threshold circuit of claim 22 wherein each weight register comprises a counter for counting the number of times the weight register is updated.

24. The global threshold circuit of claim 22 further comprising an averaging circuit for receiving the weight data signals of the weight registers and providing an output thresholding signal representative of the average magnitude of the weight data signals.

25. The global threshold circuit of claim 22 further comprising:
first, second and third shift registers coupled respectively to the outputs of the said first, second and third subtractors; and
first, second and third adders coupled respectively to the outputs of the first, second and third shift registers, the adders having outputs coupled respectively to the first, second and third weight registers for changing the value of the data signal stored in the respective weight registers
wherein said absolute comparator generates an enable signal for one of said weight registers to enable said one register to receive the output of its respective adder.

26. The global threshold circuit of claim 25 further comprising a learn rate counter coupled to the shift registers for counting the number of pixel data signals processed by the global threshold circuit and for changing the amount of shifting in proportion to the count of said pixel data signals.

* * * * *